United States Patent [19]

Sala

[11] Patent Number: 5,415,322
[45] Date of Patent: May 16, 1995

[54] MACHINE FOR AUTOMATICALLY POSITIONING AND ALIGNING CONTAINERS

[76] Inventor: Jaime M. Sala, c/a Emancipacion, 8 0817 Barcelona, Spain

[21] Appl. No.: 87,126

[22] Filed: Jul. 7, 1993

[30] Foreign Application Priority Data

Jul. 7, 1992 [ES] Spain .................. 9201508
Nov. 11, 1992 [ES] Spain .................. 9202274
Feb. 16, 1993 [ES] Spain .................. 9300301

[51] Int. Cl.[6] ............................................. B23Q 7/12
[52] U.S. Cl. ................................. 221/169; 198/392; 198/397
[58] Field of Search ............... 221/167, 169, 170, 203, 221/265, 233, 168; 198/392, 397, 400

[56] References Cited

U.S. PATENT DOCUMENTS

| | | | |
|---|---|---|---|
| 1,823,995 | 9/1931 | Streby | 221/168 |
| 3,295,659 | 1/1967 | Aidlin | 198/392 |
| 3,650,368 | 3/1972 | Nalbach | 198/397 |
| 4,130,194 | 12/1978 | Schindel et al. | 198/397 |
| 4,681,209 | 7/1987 | Marti | 198/392 |
| 4,928,808 | 5/1990 | Marti | 221/169 |

FOREIGN PATENT DOCUMENTS

| | | | |
|---|---|---|---|
| 85388 | 4/1977 | Australia . | |
| 277347 | 11/1913 | Germany . | |
| 289683 | 5/1991 | Germany | 221/167 |
| 1558379 | 12/1979 | United Kingdom . | |

Primary Examiner—Kenneth W. Noland
Attorney, Agent, or Firm—Jacobson, Price, Holman & Stern

[57] ABSTRACT

Machine for automatically positioning and aligning containers, such as plastic bottles, including a hopper (48, 48a, 48b, 48c) for receiving randomly containers (4, 4a, 4b) to be sorted, a hopper bottom (12, 12a, 29) with a peripheral edge portion spaced at a distance from the side wall of the hopper to provide a space through which the containers can drop by gravity towards a lower section, a rotatable disc (2, 2a, 2b, 2c, 2d) below the hopper bottom and container holders supported on the disc for movement therewith and having recesses therein for receiving and holding containers in a lying position. A container support shelf (28, 59) with a discharge section extends below container holders for supporting containers in the holder recesses during movement. The rotatable disc has a plurality of peripheral apertures (3, 3a, 3b) or an annular space in a peripheral portion thereof and the container holders are several exchangeable hollow frame-shaped members (1, 56, 57, 58, 60, 61) each having inner dimensions forming one of the recesses so that each recess contains most of a container body therein, and an inclined plane (11, 20, 62, 66) directed towards a central part of the hopper is disposed between the hopper bottom (12, 12a, 29) and a charging opening (1a, 56a, 61a) of the holders (1, 56, 61).

22 Claims, 10 Drawing Sheets

MACHINE FOR AUTOMATICALLY POSITIONING AND ALIGNING CONTAINERS

BACKGROUND OF THE INVENTION

This invention relates to a machine intended for automatically positioning and continuously feeding containers, for example bottles or other hollow articles made from synthetic material, which may be of very different sizes and shapes. This machine is designed for continuous feeding of other machines such as high production filling machines or similar equipment and is able to carry out this function owing to the large number of containers which it can position correctly and feed per unit of time.

Known machines of the type to which the present invention relates include in general:

a) a hopper of any shape or dimension provided with an opening to receive in bulk containers that fall onto a bottom plane whose edges are at a distance from the side wall of the hopper providing a peripheral space allowing the passage of the containers;

b) a structure provided with displacement means in an enclosed circuit, located below the bottom plane, including, fully or in part:

a plurality of detachable container holding elements removably mounted at the periphery of the structure defining a series of recesses adapted to receive containers in a lying position and provided with retaining means for one part of the containers, namely their neck, in such a way as to release them in a predetermined position, usually with the neck upward;

a plurality of discharge chutes provided under the recesses for receiving and transferring the containers, correctly oriented, towards an exit conveyor that feeds, for example, a bottling line;

c) a plane or shelf, which may be adjustable in height, located below the recesses and over the chutes, designed to support the containers when they are conveyed by the holding elements defining the recesses for receiving and retaining them in a lying position, the plane or shelf being provided with an opening in an unloading area through which the containers drop when moved into position thereover by the container holding elements.

Machines known to the applicant are the following grouped by the function they perform:

a) Aidlin machine (U.S. Pat. No. 3,295,659) relates to a machine comprising a hopper into which the containers or bottles which are to be sorted are randomly loaded, having an inclined axis, an inclined disc constituting the bottom of the hopper and adapted to rotate about the inclined axis, a plurality of openings at the periphery of the disc each adapted to receive and pass one container while retaining the neck which is supported on the disc for transporting them from a receiving zone to an unloading zone, associated with a fixed plate beneath and parallel to the rotatable disc providing a support for the container bodies during their rotation and having a release opening in an upper part of the plate aligned with the path of movement of the containers as the disc rotates, so that the containers fall, by gravity, one by one in an upright position into a fixed chute or guideway located below the opening;

Australian patent AU 499,038 (HOEHN) discloses the basic technical feature which facilitates carrying out the function of aligning the containers, previously oriented in upright position in the same machine, according to a principle similar to that disclosed in the above U.S. Pat. No. 3,295,659, from a plurality of falling chutes into which the containers fall, in an upright position, arranged under each of the openings, which are made from annular and radial elements located on the periphery of a rotary disc, rotating at the same speed as the openings and associated with a fixed support and a recovery conveyor.

The bottom of the machine and/or the rotatable disc or plane having the openings, is, in general, inclined, though it can be constructed in the shape of a cone or frustum of a cone having a vertical axis, as this solution can be found in the state-of-the-art, and it appears disclosed, for example, in German Patent DE 277347 (Polte) and U.S. Pat. No. 1,823,995 (Streby), which refers to machines of the same type as described above, in which case the inclined plane of the rotary element will by its slope and at the periphery move the containers upwardly defining a guiding duct which promotes the passage of the containers toward the openings associated with the falling chutes. The bottom plane, according to the above background prior art, is provided with a rotation movement in the same or opposite sense to the openings for collecting and conveying the containers.

On the other hand, the problem for adapting a machine of this type to different container shapes and sizes (length and cross section or thickness) has been overcome in several ways. Set forth below are the most relevant patents relating to this aspect:

British Patent GB 1,558,379 (Hoehn) which refers to a machine as disclosed in patent AU 499,038, of the same applicant, in which means have been devised to adjust the gap between the internal and the external walls and/or between the end walls of each opening to collect and hold the containers, and to adapt the space of the openings to the container size and shape. This means comprises plates with slides which provide a displacement allowing to adapt the passageway of the opening, and which are locked to bolts by nuts;

German Patent (corresponding to U.S. Pat. No. 4,130,194) DE 26 51 495 (Rationator) which refers to a machine similar to that disclosed in Australian Patent AU 499,038, wherein the openings are pierced on the edge of the disc, open at the exterior, and whose edge is formed by a series of continuous, annular, peripheral, exchangeable segments fixed to the periphery of the rotatable disc;

U.S. Pat. No. 4,681,209 (to be same applicant MARTI) which relates to a machine similar to that disclosed in Australian Patent AU 499,038, but wherein the openings are formed by radial, peripheral, detachable and exchangeable parts, which define the areas to house the containers as delimited between their sides, the edge of a rotatable disc and the hopper wall.

However, none of the above machines is completely satisfactory with regard to the adaptability of the machine to several sizes and/or forms of the containers, or the conditions in which the containers are conveyed. These prior machines have the drawbacks pointed out below.

The machines disclosed in the Australian Patent AU 499,038 and the British Patent GB 1,558, 379 require individual parts associated with each opening being adjusted, which means a delicate adjustment which must be carried out by skilled personnel; there exists the risk that some mismatching or position-related impairment of some of the parts occur due to impacts caused by clogging of the containers during their movement; summarizing, these machines require handling a great number of complex components with consequent labor cost.

The machine of German Patent DE 26 51 495, requires some continuous annular segments to be changed, and therefore has the following drawbacks:

the use of mechanized parts of a certain length and, therefore, of a limited modularity, different for each form of container;

locking the segments to the periphery of the disc with screws, which requires a delicate and time consuming handling at the installation point, and which, in general, demands an access structure to be provided at the top, within the machine, and/or the use of lifting means for removing the segments;

friction with the periphery of the receptacle, as the openings are outwardly open, which can produce damage to the containers (namely, bearing in mind the thin thickness of the wall, in a number of cases) as well as breaking during their access to the openings and in the area of falling downward into the evacuation ducts;

The machine of U.S. Pat. No. 4,681,209 has a risk similar to the above mentioned for the Australian and British patents, (HOEHN) that mismatching or impairments of the position devised for the unit radial parts, by accidental causes, and as the openings are outwardly open damages can likewise be produced to the containers, as well as problems of breaking upon access of the containers within the opening and the unloading area.

Of course, a machine of the type disclosed in U.S. Pat. No. 3,295,659 would require, for its adaptation to different forms of containers, changing the whole disc provided with openings with the consequent cost and labor for its execution.

It must be pointed out, in addition, that conveying containers in openings provided in a rotary element such as a disc, requires, for a drive stability, a significant thickness of the disc which allows it to encompass, at least, a significant part of the thicker part of the containers as it appears in the above U.S. Pat. No. 3,295,659, with subsequent production cost, weight and power consumption. In addition, in general, a part of the container always remains on the top and another under the transport element formed by the openings which produces a resistance to forward movement because of the atmosphere within the machine which can affect the positioning stability of slight containers such as plastic bottles treated in these machines, namely, at high speeds of the transport element.

BRIEF SUMMARY OF THE INVENTION

One object of this invention is to provide a machine of the above disclosed type which is adaptable to several forms of containers to be treated which overcomes the above mentioned drawbacks, due to the use of:

a single rotatable annular element or disc provided with openings having fixed sizes in an area beyond the outer peripheral portion of the hopper bottom;

a plurality of exchangeable hollow frame-shaped container holders each having inner dimensions forming one recess, within which the containers are virtually fully housed, and external dimensions compatible with those of the openings of the rotatable disc, which are the same, for all container holders for a given machine.

The container holders can be made by molding in plastic material or metal.

In order to improve the passage of the containers from the hopper bottom into the recesses in the container holders an inclined plane directed towards the central part of the main hopper is disposed between the bottom of the hopper and the upper opening of each container holder.

The above and other objects, advantages and features of the present invention will become more apparent from the following description of certain preferred embodiments thereof.

BRIEF DESCRIPTION OF THE DRAWINGS

The invention will now be described in detail with reference to the accompanying drawings wherein.

DETAILED DESCRIPTION

Figure 11:
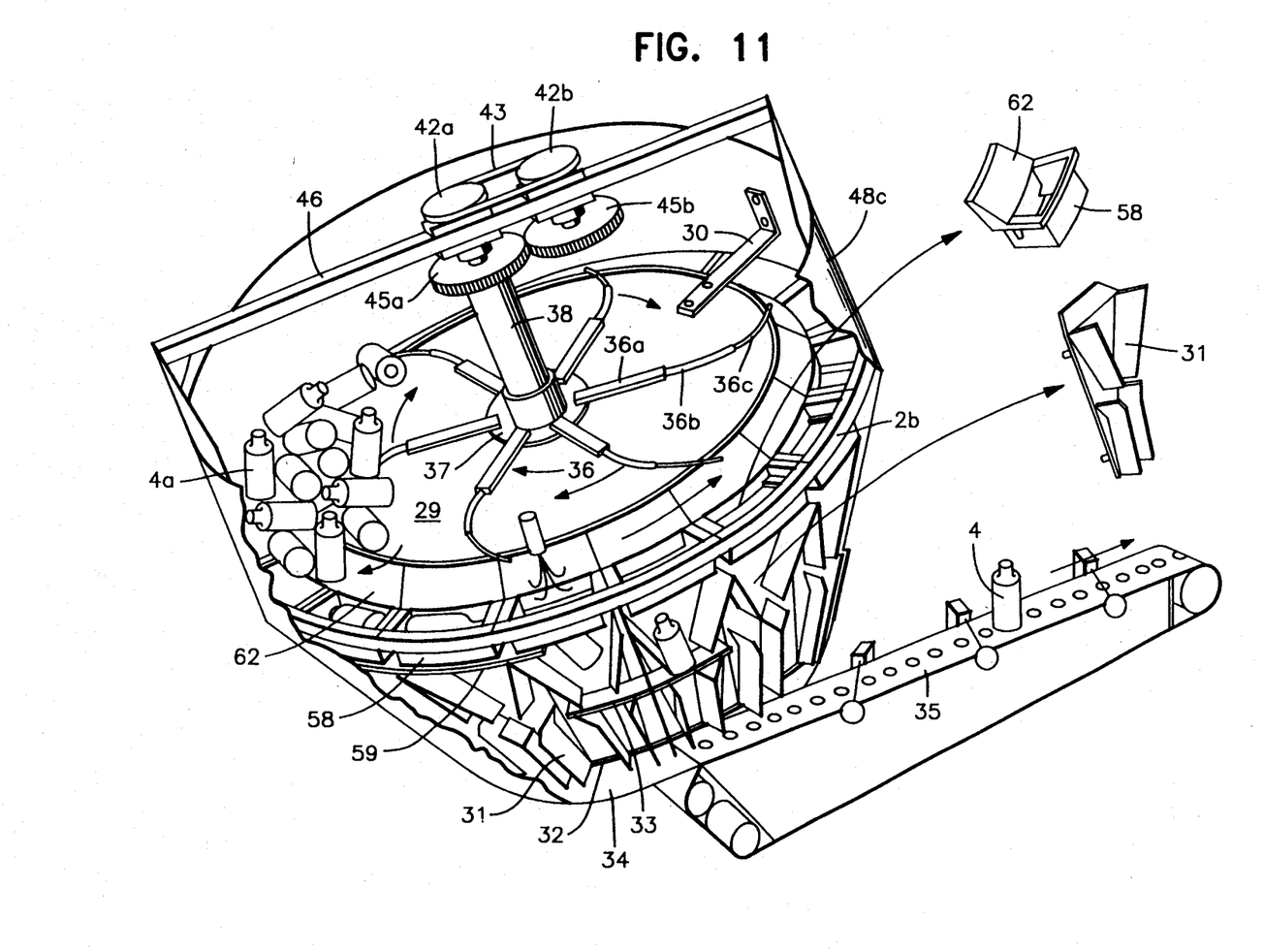
FIG. 11 is a perspective view of a machine according to the invention provided with radial rotary arms over the bottom of the hopper.

As seen in FIG. 11 the machine of this invention comprises a basic structure similar to that in applicant's prior U.S. Pat. No. 4,681,209 to the same inventor including a hopper 48c provided with an opening for loading in bulk containers 4a that fall onto a bottom member having edges spaced from the hopper wall to provide a peripheral space through which the containers can pass.

Figure 13:
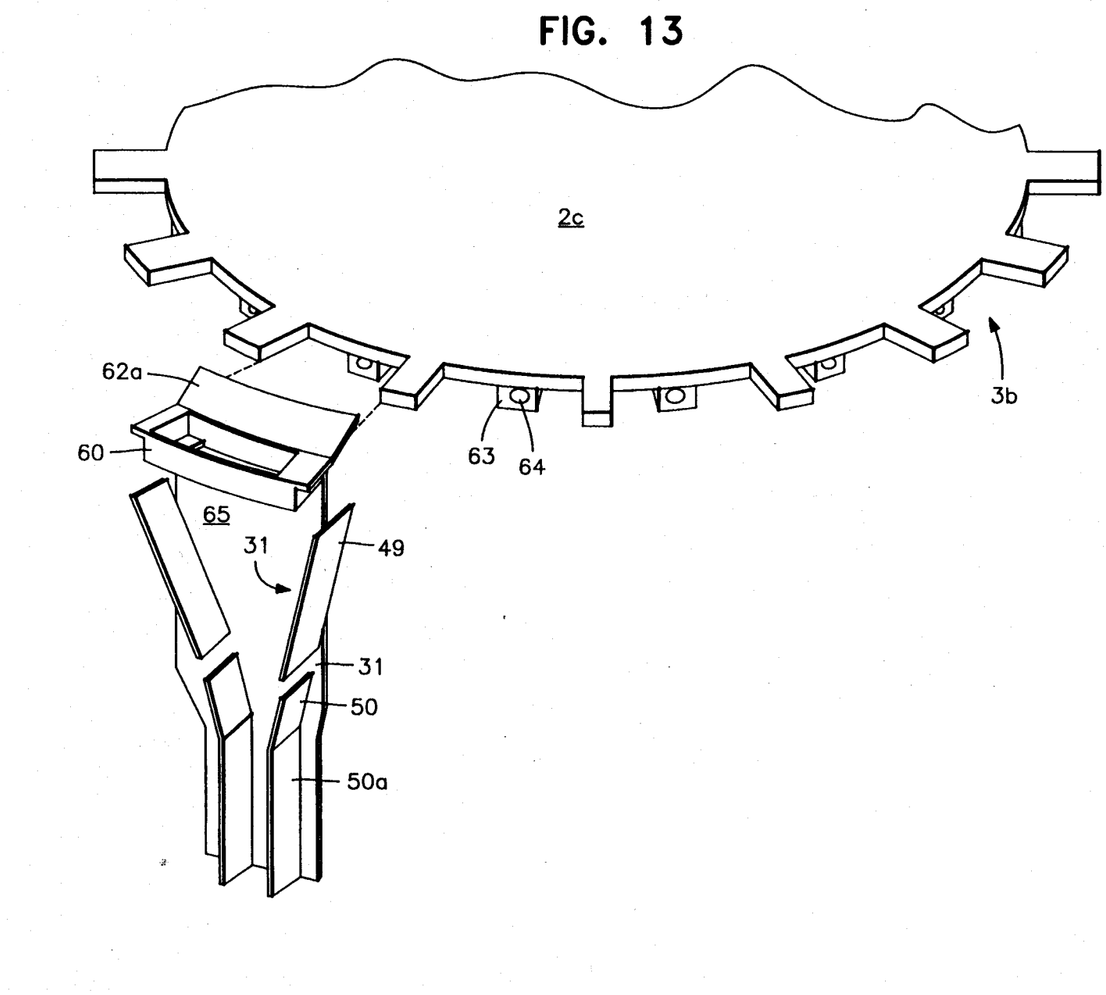
FIG. 13 is a perspective exploded view showing an alternative embodiment of the container holders and related falling chutes forming an exchangeable unit.
Figure 14:
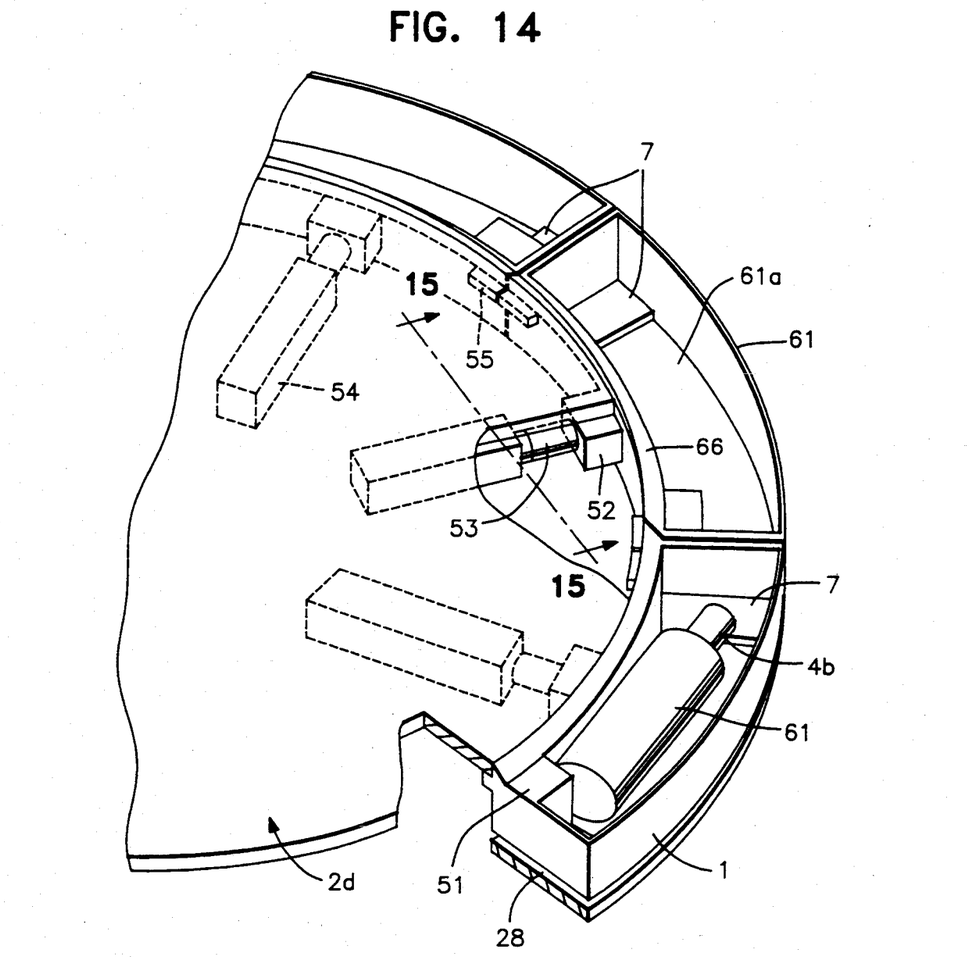
FIG. 14 is a fragmented perspective view of another embodiment of the invention showing the frame-shaped container holders attached to the edge of a rotatable disc.

The invention is mainly based on exchangeable container holders, constituted by hollow frame shaped pieces 1, 56, 57, 58, 60, 61 forming recesses for receiving and holding the containers 4, 4a, 4b in a lying position from the peripheral space of the bottom member, the container holders having an inner dimension matching one of the containers 4, 4a, 4b so that they can receive most of the container body and an external dimension allowing at least one part thereof to fit in corresponding apertures 3, 3a, 3b of a rotatable disc 2, 2a, 2b, 2c, 2d, (FIGS. 1 to 4 and 7–13) supported below the hopper bottom member or connected to the peripheral portion of rotatable disc 2d (FIG. 14). The containers 4, 4a, 4b, rest on a container support shelf 28, 59 until reaching a discharge section (see FIG. 4), according to the described technique for upright positioning.

As shown in FIGS. 1 to 10 and 13, each container holder 1, 56, 57, 58, 60, 61 comprises:

in the upper part a charging opening 1a for allowing the containers to pass therethrough and two external overhanging flanges 5 for seating on the rotatable disc 2;

in its lower part, a discharging opening 1b limited by two coplanar flanges 7, for supporting a neck of the containers 4, and positioned beneath the rotatable disc 2 so that the center of gravity of the containers lies under the lower surface of disc 2.

Figure 5:
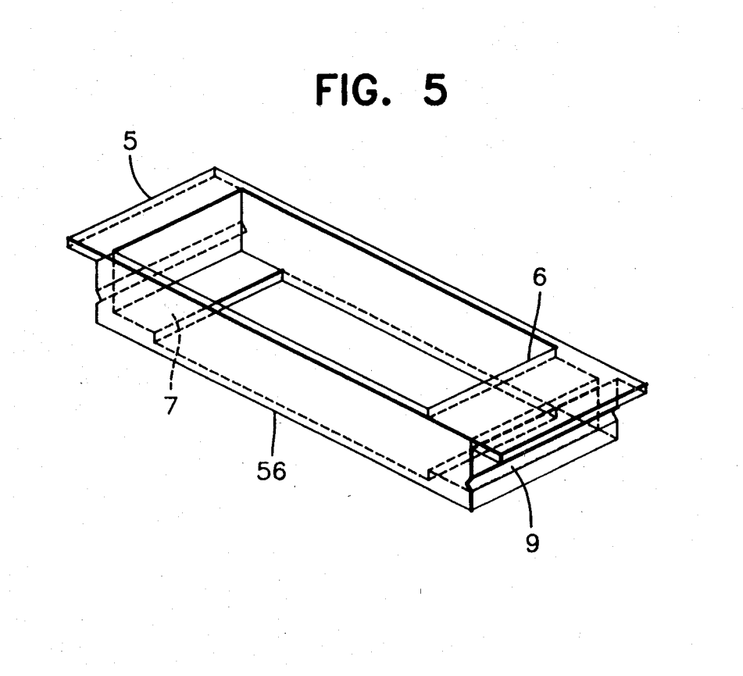
FIG. 5 is a perspective view on an enlarged scale of a container holder shown in FIG. 2.
Figure 6:
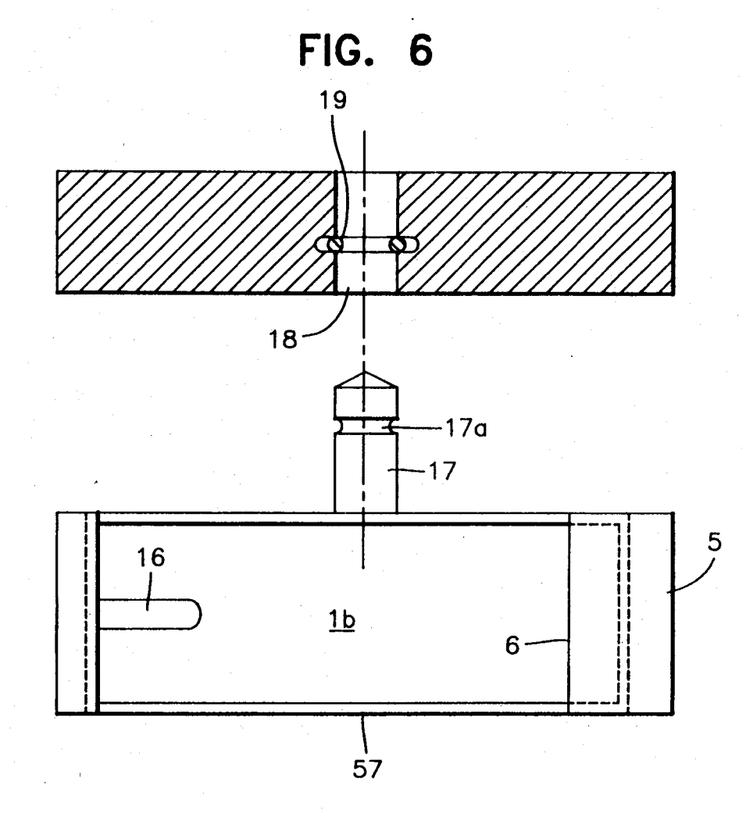
FIG. 6 is a top plan view of an alternative embodiment of the container holder with another attachment means for removably connecting it to a disc of the type represented in FIG. 3.

In the embodiment shown in FIGS. 5 and 6, the charging openings of container holders 56, 57 are limited by a further flange 6 parallel to coplanar flanges 7 engageable with the bottom of a container during the displacement to avoid positioning over the flange 7.

The container holder 57 in FIG. 6 has its discharge opening 1b limited at one of its ends by a rod 16 opposite to overhanging flange 7. This rod is for entering the mouth of wide mouth containers like cans to support them and allowing their upright positioning according to the well know technique described in the above cited prior patents. Container holder 57 also has at the rear side a protruding rod 17 with a pointed end and an annular groove 17a near this end for fitting into a receptacle member comprising an aperture 18 including an elastic retaining ring 19.

Figure 4:
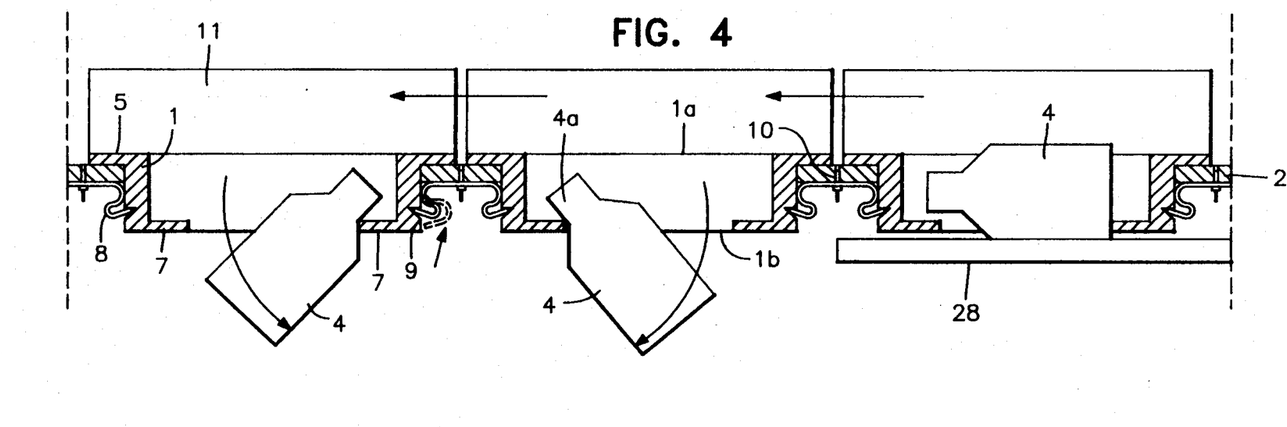
FIG. 4 is a cross-sectional view of a segment, or longitudinal part development of the periphery of the disc showing the means supporting the container holders removably fitted in the openings in the disc.

As seen in FIG. 4, each of the hollow frame-shaped container holders 1 is removably held socketed within apertures 3 of the rotatable disc 2, due to elastic catch fingers 8 fixed to rotatable disc 2 by screws 10, and having free ends engageable in retaining grooves 9 on the end walls of container holders 1.

Figure 7:
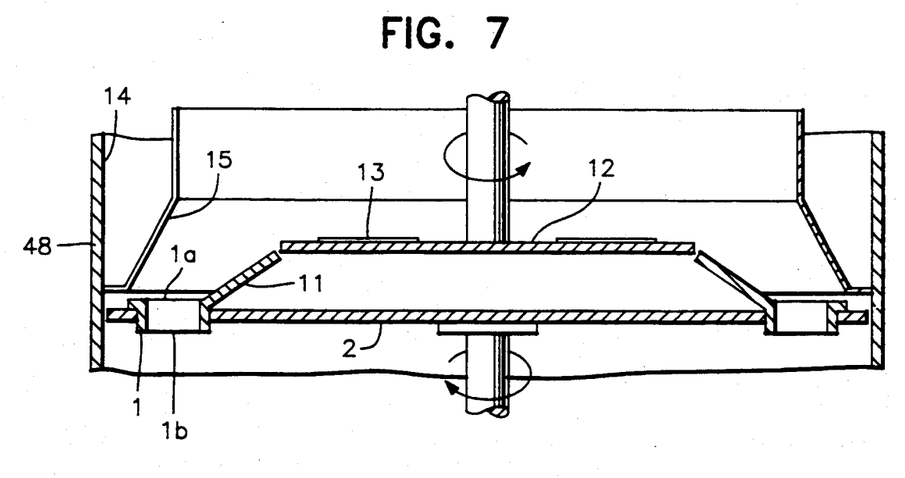
FIG. 7 is a vertical cross-sectional view of part of a machine according to the invention.
Figure 8:
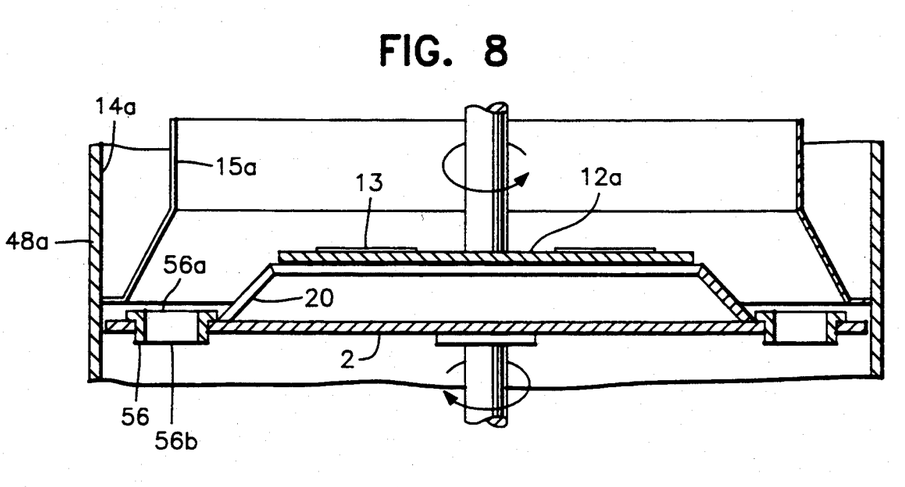
FIG. 8 is a view similar to that of FIG. 7 showing an alternative embodiment of the invention.

In the embodiment illustrated in FIGS. 7 and 8 the bottom of the hopper is constituted by another rotatable disc 12 revolving in an opposite direction to the disc 2, so as to return containers incorrectly positioned towards the periphery in the direction of a charging area. The disc 12 is advantageously provided with radial members, such as roughened radial strips 13 in order to better draw the containers without damaging them.

An inclined plane directed towards the central part of the hopper joins the bottom edge and the inner edge of the charge opening 1a, 56a of each frame shaped container holder 1, 56.

In FIG. 7, the inclined plane is constituted by a projecting flange 11, which extends upwards from the inner edge of the charging opening 1a of the container holder 1.

In FIG. 8, the inclined plane can alternatively be constituted by a frustum conical wall 20 integral with the rotatable disc 2 and whose lower edge lies adjacent to the inner border of the charge opening 56a of each of the container holders 56.

In both cases (FIGS. 7 or 8), the inclined plane converges with another upper plane constituted by a wall 15, 15a superimposed and fixed to the inner hopper wall 14, 14a of a hopper 48, 48a, providing a channel which facilitates the entrance of containers 4 towards the recesses of container holders 1.

Figure 9:
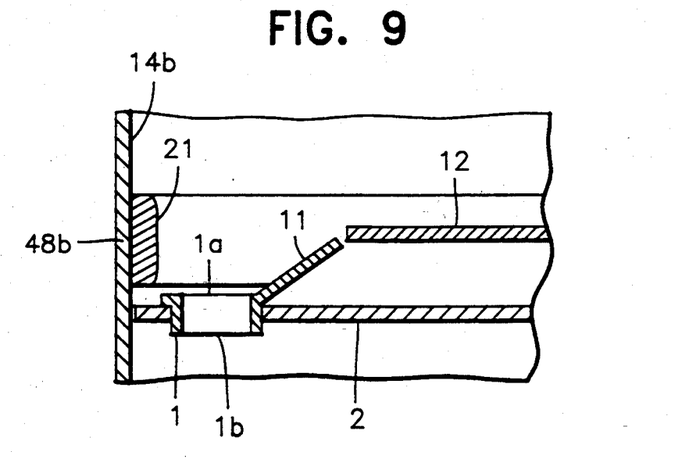
FIG. 9 is a fragmented vertical cross-sectional view showing on an enlarged scale part of the machine with a means cooperating in the positioning of the containers into the recesses within the container holders.

FIG. 9 shows an elongated pad profile 21 fixed to the inner wall 14b of hopper 48b, covering the space between the outer edge of the charge opening 1a of each container holder 1 and inner hopper wall 14b and extending over the outer peripheral portions of the frame-shaped container holders 1, for cooperating in the positioning of the containers 4 into the recesses of container holders 1.

Figure 10:
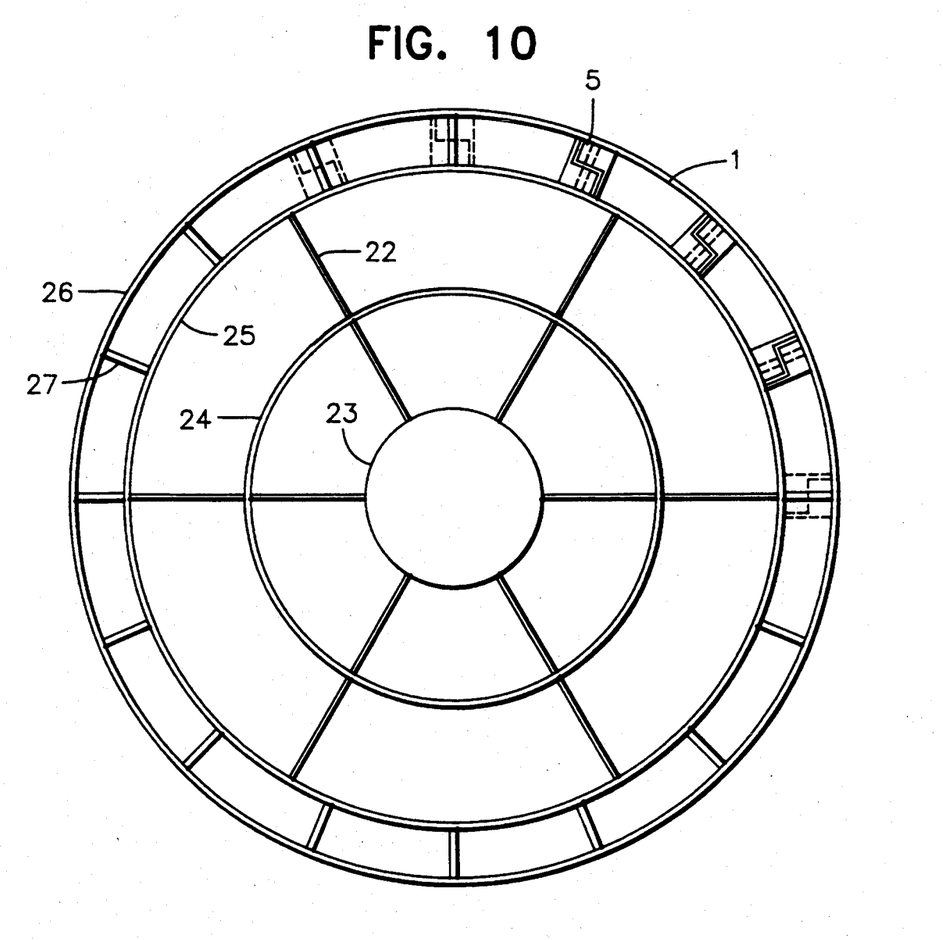
FIG. 10 is a top plan view showing a preferred structure of a container holder support means.

FIG. 10 illustrates a preferred structure for the rotatable disc or plane 2, comprising a plurality of radial rods 22 connected to a central ring 23, and to an intermediate ring 24 and a peripheral crown constituted by two spaced rings 25 and 26 connected by partition walls 27 forming apertures to receive socketed therein the container holders 1.

In the machine illustrated in FIG. 11 the hopper bottom member is constituted by an inclined stationary disc 29 attached through a bracket 30 to the inner wall of a hopper 48c. Over disc 29 a device for removing the accumulated containers 4a, and/or for moving wrongly positioned containers towards a charging area is located. This device comprises a plurality of radial arms 36 integral with a rotatable central hollow shaft 38. Radial arms 36 are connected to a central disc portion 37 coaxial and integral with the shaft 38, and comprise a first radially inner rigid portion 36a, a middle resilient part 36b slightly curved and a third radially outer part 36c extremely curved rearwardly with respect to the direction of rotating movement and constituted by smooth and flexible elements extending during operation to a position above the container holders.

FIG. 11 also shows a series of falling chutes 31 integral with rotatable disc 2b and with a second parallel rotatable disc 32, placed at a lower level as well as an intermediate fixed shelf 33, which divides the falling of the containers into a double sequence as disclosed in cited U.S. Pat. No. 4,681,209. Falling chutes 31, align the containers along a stationary bottom 34 from which they are evacuated by an exit conveyor 35.

Figure 12:
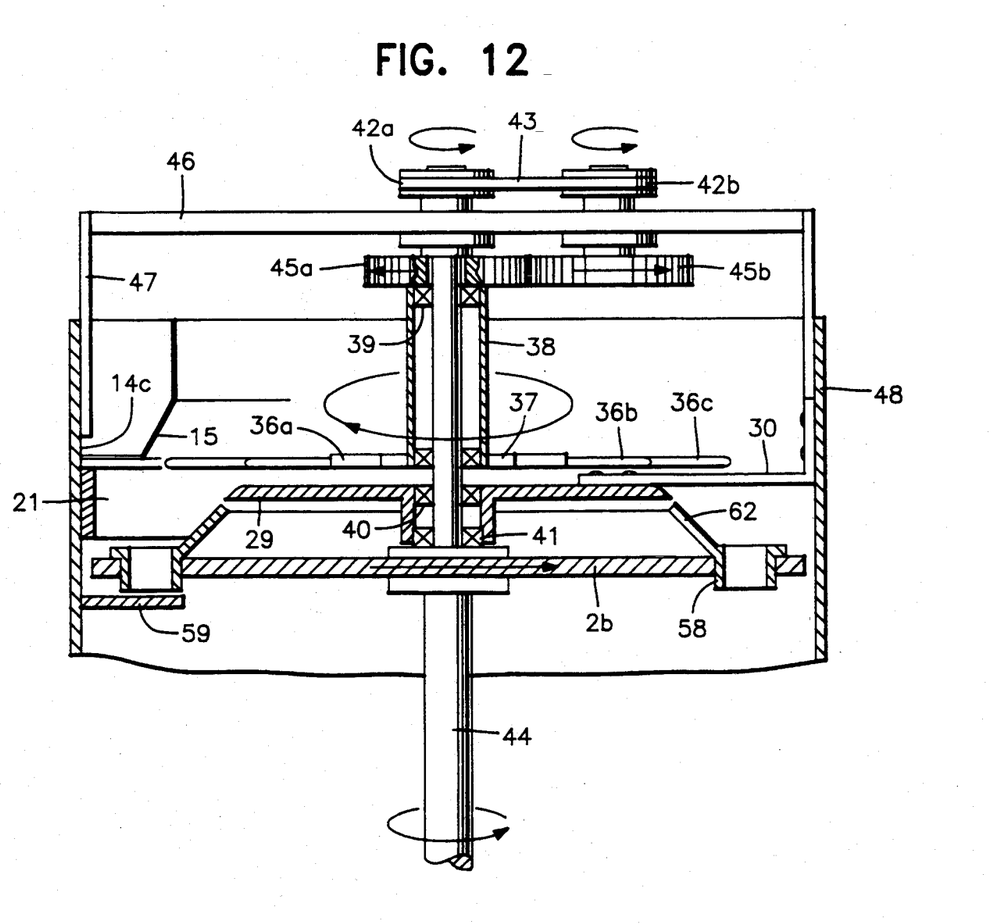
FIG. 12 is a vertical cross-sectional view of part of the machine of FIG. 11.

The central hollow shaft 38 is driven by a reversal rotating mechanism which can clearly be understood from FIG. 12. This figure shows a central axis 44, supporting the rotatable disc 2b with peripheral apertures where the container holders 1 are socketed, the axis extending upwardly above rotatable disc 2b, and being connected to a first wheel 42a which is linked through an endless belt 43 to a second coplanar wheel 42b which is coupled itself to a first gearwheel 45b intermeshing with a second coplanar gearwheel 45a fixed at one of the ends of the central hollow shaft 38. Some bearings 39, 40 and 41 are interposed between the movable parts and the fixed ones as can be clearly seen from this figure. This reversal rotating mechanism is supported by a bridge 46 supported by brackets 47 integral with the inner wall 14c of the hopper 48c.

Figure 1:
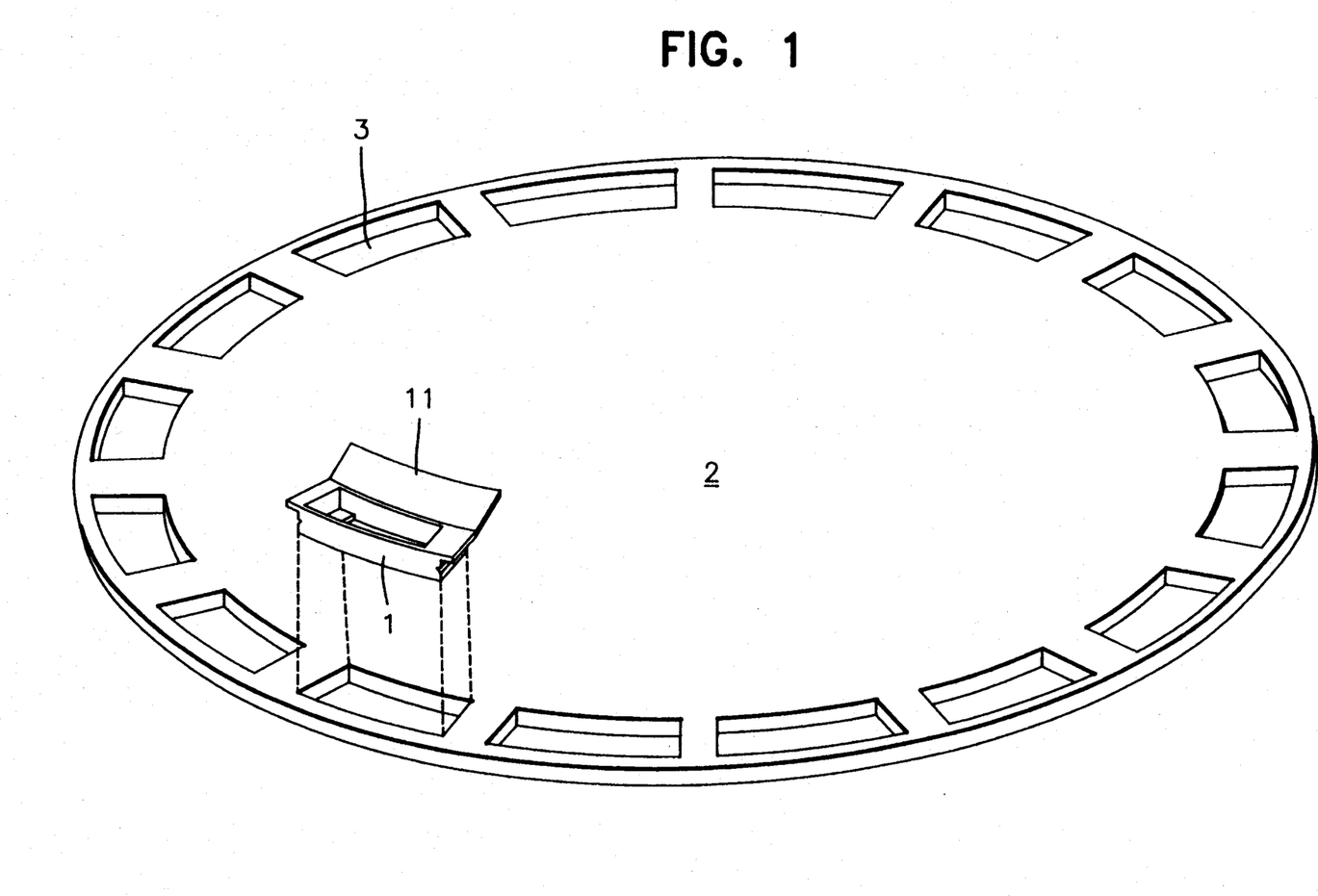
FIG. 1 is a perspective view of a container holder support means in the form of a disc provided with peripheral openings to receive socketed therein at least a part of the body of a frame shaped container holder with an inclined flange projecting upwardly, illustrated before positioning on the disc.
Figure 2:
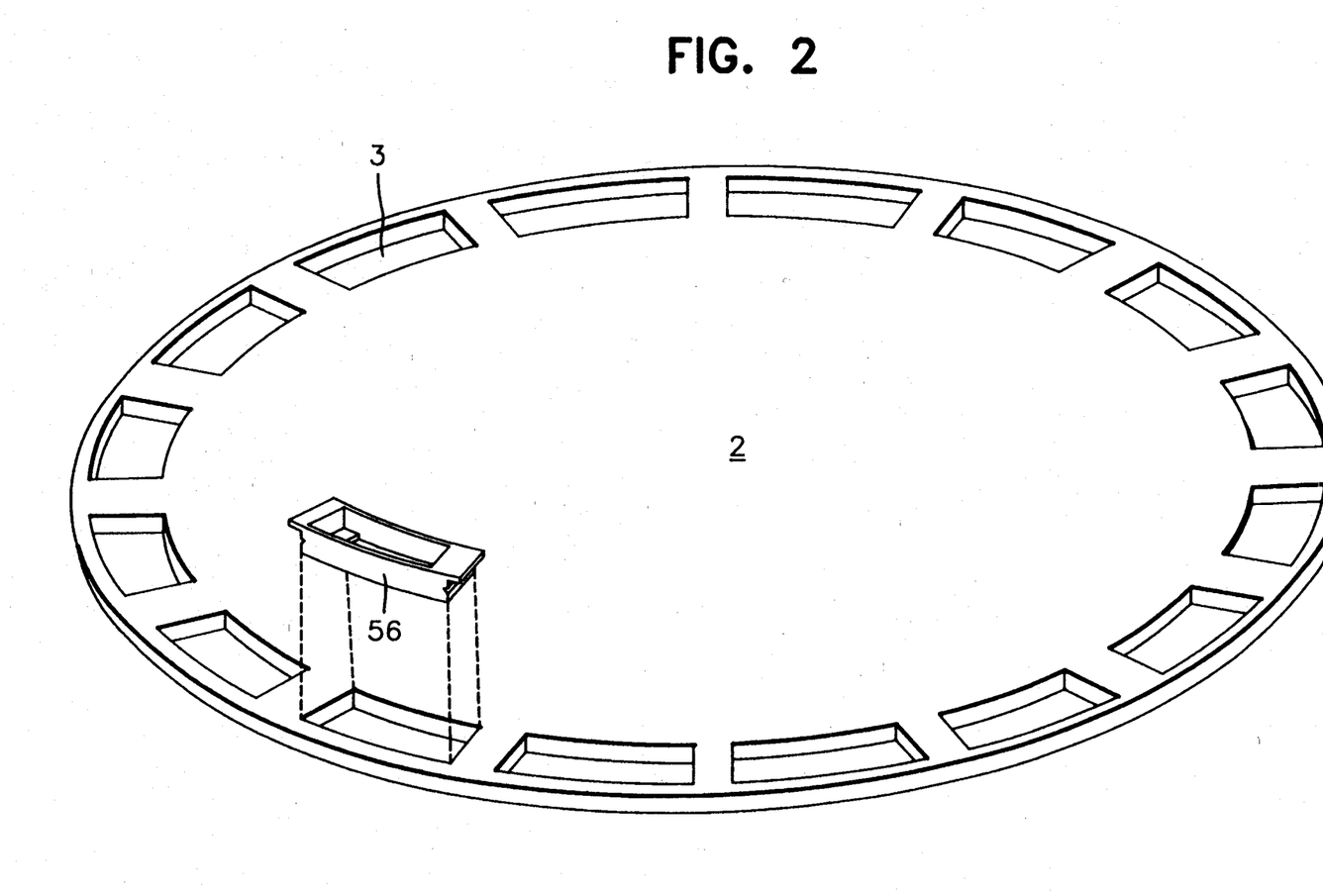
FIG. 2 is a view similar to that of FIG. 1 but showing a frame shaped container holder without an inclined projecting flange.
Figure 3:
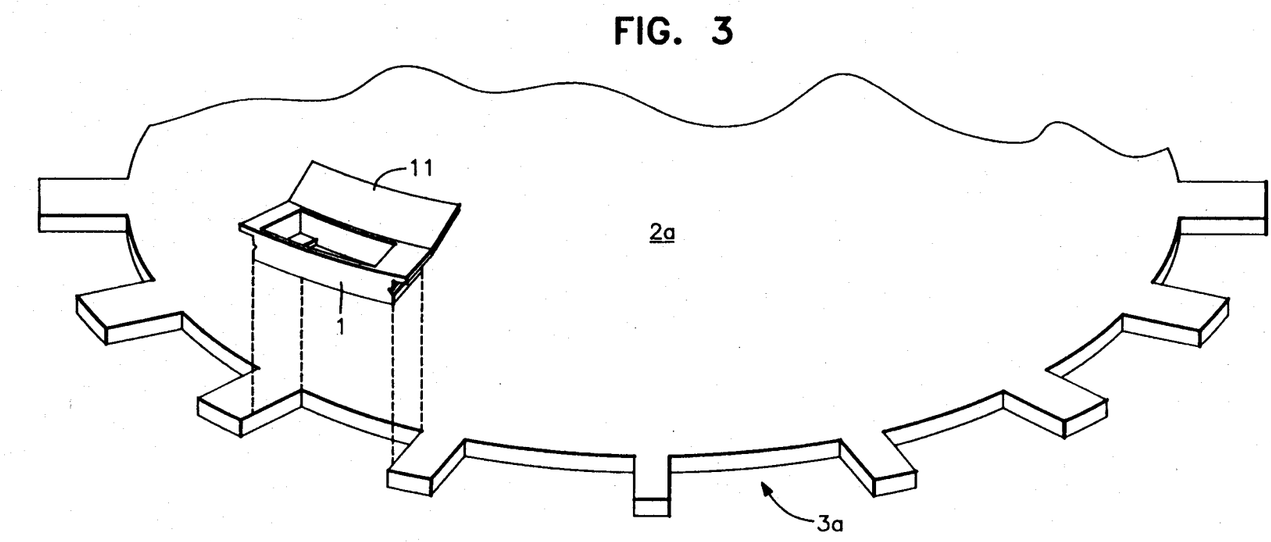
FIG. 3 is a partial view similar to that of FIGS. 1 and 2 showing a disc provided with apertures open at the outer peripheral edge.

FIG. 13 shows another embodiment of the invention where a rotatable disc 2c similar to that in FIG. 3 has open peripheral apertures 3b and removable retaining means similar to the ones detailed in FIG. 6 are used, indicated by numbers 63 and 64. In this case, each frame shaped container holder 60, provided with an upwardly projecting flange 62a is connected through its rear wall to the falling and aligning chutes 31a. The falling chutes 31a comprise a rear plate 65, to which a first pair of side convergent plates 49 and a second pair of side parallel plates 50a with an upper convergent portion 50 are attached.

FIG. 14 shows still another embodiment of the invention where the container holders 61 are located adjacent the outer edge of a rotatable disc 2d over which another bottom member (static or rotatable and not illustrated) is arranged, the upwardly projecting flanges 66 joining the outer edge of the non-illustrated bottom member to the inner border of the charging opening 61a of holders 61 as previously described.

Figure 15:
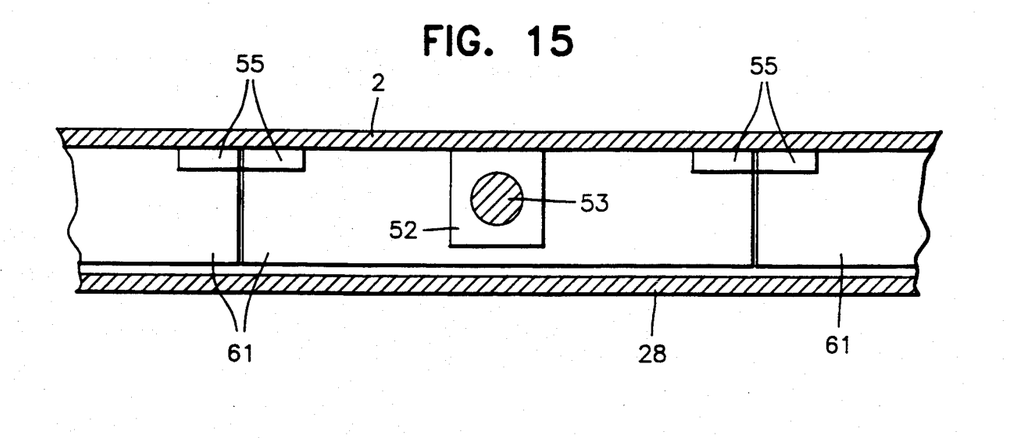
FIG. 15 is a cross-sectional view taken along line XV—XV of FIG. 14.

As can be seen in FIGS. 14 and 15 in this embodiment immobilizing and positioning means have been provided for preventing pivoting movement of the container holders 1.

This immobilizing and positioning means is constituted by an enlarged prismatic-shaped portion 52 at the radially outer part of a radial member 53 protruding from the rear side of each frame-shaped container holder 61 and removably attachable to a female connector 54 (similar to that described in FIGS. 6 and 13). The upper part of enlarged portion 52 lies in engaged position on the bottom of disc 2d, just under its outer edge portion. In addition to this, two bracing parts 55 protrude from the rear side of each frame-shaped container holder 61, near its two ends, and the upper parts of these also lie in the engaged position on the bottom of disc 2d just under its outer edge position.

Container holder 61 also includes a further flange 51 parallel to coplanar flanges 7, limiting the charging opening and adjacent one of the opposite ends thereof, further flange 51 being at a rear part (with respect to the rotation direction) so as to be engageable with a bottom of a container avoiding the bottom to be supported by the corresponding contiguous flange 7.

As can be seen in FIG. 15, the container holders 61 located adjacent the outer edge of the disc 2d have between their ends a slight clearance to avoid jamming.

The machine with the features previously described is easily adaptable to different sizes and shapes of the containers to be handled and provides also for transporting the containers with a minimum of interference with the static parts thereby providing careful handling. The conditions of the attachment between the container holder means employed and the support (rotatable disc) are also very stable.

I claim:

1. Machine for automatically positioning and aligning containers, such as plastic bottles, comprising:
   a main hopper for receiving a plurality of randomly positioned containers and having a central part;
   a side wall on said main hopper;
   a bottom in said main hopper having a peripheral portion spaced from said side wall to provide a space through which containers on said bottom can pass;
   container holder support means comprising a rotatable disc having a peripheral portion and a plurality of apertures in said peripheral portion of said disc and supported below said hopper for movement of said peripheral portion thereof in a path adjacent said peripheral portion of said bottom;
   means for driving said container holder support means in said path;
   container holder means mounted on said container holder support means for movement therewith and having recesses therein for receiving containers from said peripheral portion of said bottom and holding said containers in a lying position;
   discharge openings in said container holder means for allowing containers to pass therethrough;
   container support shelf means extending below said container holder means for supporting containers in a lying position in said recesses during movement of said container holder means;
   a discharge section in said support shelf means for discontinuing support of containers at a predetermined location so that containers in said container holder means pass through said discharge apertures at said discharge section;
   tilting means on said container holder means engaging a part of each container for tilting each container into a predetermined position as each container passes through a respective discharge opening at said discharge section;
   chute means mounted below and movable with said container holder means for receiving, orientating and guiding containers passing through said discharge openings into a predetermined position, each chute means having a lower exit portion;
   said container holder means comprising a plurality of exchangeable hollow frame-shaped container holders each having inner dimensions forming one of said recesses so that each recess contains most of a container body therein and external dimensions to facilitate fitting at least part of one of said container holders in one of said apertures in said rotatable disc;
   a charging opening in each container holder for passage of a container therethrough into said recess; and
   inclined plane means directed towards said central part of said main hopper and disposed between said bottom of said main hopper and said charging openings of said container holders.

2. Machine as claimed in claim 1 wherein:
said rotatable disc has an outer edge; and
said container holders are disposed adjacent said outer edge of said rotatable disc.

3. Machine as claimed in claim 1 wherein:
said charging opening of each container holder has an inner edge; and
said inclined plane means comprises a flange projecting upwardly from said inner edge of each charging opening.

4. Machine as claimed in claim 1 wherein:
said charging opening of each container holder has an inner edge; and
said inclined plane means comprises a frustum conical wall mounted on said container holder support means and having a lower edge in adjacent spaced relation to said inner edge of each of said charging openings of said container holders.

5. Machine as claimed in claim 1 and further comprising:
a second inclined plane means mounted on said side wall of said main hopper and superimposed relative to said container holders so that both inclined plane means converge toward said container holders.

6. Machine as claimed in claim 1 and further comprising:
   an outer edge on said charging opening of each of said container holders; and
   an elongated pad profile mounted on said main hopper side wall and protruding over at least a part of a space between said outer edge of each charging opening of said container holders and said main hopper side wall.

7. Machine as claimed in claim 1, and further comprising:
   means for removably fitting said container holders in said apertures.

8. Machine as claimed in claim 7 wherein said means for removably fitting said container holders in said apertures comprise:
   outer side walls on each of said container holders;
   a retaining groove on each of said outer side walls; and
   resilient retaining means mounted on said container holder support means and engageable in said retaining grooves for holding said container holders in said apertures.

9. Machine as claimed in claim 2 and further comprising:
   retaining openings in said outer edge of said rotatable disc;
   resilient retaining means in said retaining openings;
   a mounting element projecting from each of said container holders insertable in one of said retaining openings; and
   an annular groove on each of said mounting elements engageable with said resilient retaining means for removably retaining said container holders on said rotatable disc.

10. Machine as claimed in claim 1 wherein said tilting means comprises:
    two opposite ends in each of said discharge openings;
    two coplanar flanges at said two opposite ends for supporting a neck of a container received in a container holder; and
    a further flange parallel to said coplanar flanges limiting said charging opening adjacent one of said opposite ends and engageable with a bottom of a container.

11. Machine as claimed in claim 1 wherein said tilting means comprises:
    two opposite ends in each of said discharge openings;
    a rod at one of said ends and a flange at the other of said ends for supporting a neck of a container when received in a recess of a container holder.

12. Machine as claimed in claim 1 and further comprising:
    supporting flanges on each container holder for supporting said container holders on said rotatable disc adjacent said apertures therein.

13. Machine as claimed in claim 2 and further comprising:
    immobilizing and positioning means for preventing pivoting movement of said container holders relative to said rotatable disc.

14. Machine as claimed in claim 13 wherein said immobilizing and positioning means comprises:
    a plurality of receptacle members substantially circumferentially spaced on a lower surface of said rotatable disc in adjacent spaced relationship with respect to said outer edge thereof;
    a connecting member projecting from each container holder for releasable engagement with one of said receptacle members and having an inner part adjacent said container holder;
    an enlarged prismatic-shaped portion on said connecting member at said inner part thereof; and
    an upper surface on said prismatic-shaped portion engageable with said lower surface of said rotating disc adjacent said outer edge thereof when said container holders are mounted on said rotating disc.

15. Machine as claimed in claim 14 wherein said connecting member further comprises:
    at least two bracing members projecting from each of said container holders proximate the ends thereof and having upper surfaces engaging said lower surface of said rotating disc adjacent said outer edge thereof when said container holders are mounted on said rotating disc.

16. Machine as claimed in claim 1 wherein:
    said container holders are each connected to a respective chute means forming an exchangeable unit of a combined container holder and chute means.

17. Machine as claimed in claim 1 and further comprising:
    an upwardly extending central axis for said main hopper and container holder support means;
    a central bushing rotatably mounted on said main hopper coaxially with said central axis;
    a plurality of radial arms integral with said central bushing and positioned in said main hopper;
    radially outer ends on said arms each comprising an elastic portion backwardly curved with respect to the rotating direction of said arms for engaging and removing containers wrongly positioned relative to said container holders towards a charging area for said main hopper; and
    means for driving said central bushing in a direction of rotation opposite to the direction of movement of said container holder means.

18. Machine as claimed in claim 17 wherein each of said radial arms comprises:
    a first radially inner rectilinear and rigid part;
    a middle resilient and curved part; and
    a radially outer curved part comprising a smooth and flexible element extending during operation to a position above said container holders.

19. Machine for automatically positioning and aligning containers, such as plastic bottles, comprising:
    a main hopper for receiving a plurality of randomly positioned containers and having a central part;
    a side wall on said main hopper;
    a bottom in said main hopper having a peripheral portion spaced from said side wall to provide a space through which containers on said bottom can pass;
    container holder support means having a peripheral portion and supported below said hopper for movement of said peripheral portion thereof in a path adjacent said peripheral portion of said bottom;
    means for driving said container holder support means in said path;
    container holder means mounted on said container holder support means for movement therewith and having recesses therein for receiving containers from said peripheral portion of said bottom and holding said containers in a lying position;

discharge openings in said container holder means for allowing containers to pass therethrough;

container support shelf means extending below said container holder means for supporting containers in a lying position in said recesses during movement of said container holder means;

a discharge section in said support shelf means for discontinuing support of containers at a predetermined location so that containers in said container holder means pass through a respective discharge opening at said discharge section;

tilting means on said container holder means engaging a part of each container for tilting each container into a predetermined position as each container passes through said discharge openings at said discharge section;

chute means mounted below and movable with said container holder means for receiving, orientating and guiding containers passing through said discharge openings into a predetermined position, each chute means having a lower exit portion;

said container holder means comprising a plurality of exchangeable hollow frame-shaped container holders each having inner dimensions forming one of said recesses so that each recess contains most of a container body therein;

a charging opening in each container holder for passage of a container therethrough into said recess;

an inner edge on each charging opening; and inclined plane means comprising a flange projecting upwardly from said inner edge of each charging opening and directed towards said central part of said main hopper and disposed between said bottom of said main hopper and said charging openings of said container holders.

20. Machine for automatically positioning and aligning containers, such as plastic bottles, comprising:

a main hopper for receiving a plurality of randomly positioned containers and having a central part;

a side wall on said main hopper;

a bottom in said main hopper having a peripheral portion spaced from said side wall to provide a space through which containers on said bottom can pass;

container holder support means having a peripheral portion and supported below said hopper for movement of said peripheral portion thereof in a path adjacent said peripheral portion of said bottom;

means for driving said container holder support means in said path;

container holder means mounted on said container holder support means for movement therewith and having recesses therein for receiving containers from said peripheral portion of said bottom and holding said containers in a lying position;

discharge openings in said container holder means for allowing containers to pass therethrough;

container support shelf means extending below said container holder means for supporting containers in a lying position in said recesses during movement of said container holder means;

a discharge section in said support shelf means for discontinuing support of containers at a predetermined location so that containers in said container holder means pass through said discharge openings at said discharge section;

tilting means on said container holder means engaging a part of each container for tilting each container into a predetermined position as each container passes through a respective discharge opening at said discharge section;

chute means mounted below and movable with said container holder means for receiving, orientating and guiding containers passing through said discharge openings into a predetermined position, each chute means having a lower exit portion;

said container holder means comprising a plurality of exchangeable hollow frame-shaped container holders each having inner dimensions forming one of said recesses so that each recess contains most of a container body therein;

a charging opening in each container holder for passage of a container therethrough into said recess; and an outer edge on said charging opening of each of said container holders;

inclined plane means directed towards said central part of said main hopper and disposed between said bottom of said main hopper and said charging openings of said container holders; and an elongated pad profile mounted on said main hopper side wall and protruding over at least a part of a space between said outer edge of each charging opening of said container holders and said main hopper side wall.

21. Machine for automatically positioning and aligning containers, such as plastic bottles, comprising:

a main hopper for receiving a plurality of randomly positioned containers and having a central part;

a side wall on said main hopper;

a bottom in said main hopper having a peripheral portion spaced from said side wall to provide a space through which containers on said bottom can pass;

container holder support means having a peripheral portion and supported below said hopper for movement of said peripheral portion thereof in a path adjacent said peripheral portion of said bottom;

means for driving said container holder support means in said path;

container holder means mounted on said container holder support means for movement therewith and having recesses therein for receiving containers from said peripheral portion of said bottom and holding said containers in a lying position;

discharge opening in said container holder means for allowing containers to pass therethrough;

container support shelf means extending below said container holder means for supporting containers in a lying position in said recesses during movement of said container holder means;

a discharge section in said support shelf means for discontinuing support of containers at a predetermined location so that containers in said container holder means pass through said discharge openings at said discharge section;

tilting means on said container holder means engaging a part of each container for tilting each container into a predetermined position as each container passes through a respective discharge opening at said discharge section;

chute means mounted below and movable with said container holder means for receiving, orientating and guiding containers passing through said discharge openings into a predetermined position, each chute means having a lower exit portion;

said container holder means comprising a plurality of exchangeable hollow frame-shaped container holders each having inner dimensions forming one of said recesses so that each recess contains most of a container body therein;

a charging opening in each container holder for passage of a container therethrough into said recess;

inclined plane means directed towards said central part of said main hopper and disposed between said bottom of said main hopper and said charging openings of said container holders;

two opposite ends in each of said discharge openings;

two coplanar flanges at said two opposite ends for supporting a neck of a container received in a container holder; and a further flange parallel to said coplanar flanges limiting said charging opening adjacent one of said opposite ends and engageable with a bottom of a container.

22. Machine for automatically positioning and aligning containers, such as plastic bottles, comprising:

a main hopper for receiving a plurality of randomly positioned containers and having a central part;

a side wall on said main hopper;

a bottom in said main hopper having a peripheral portion spaced from said side wall to provide a space through which containers on said bottom can pass;

container holder support means having a peripheral portion and supported below said hopper for movement of said peripheral portion thereof in a path adjacent said peripheral portion of said bottom;

means for driving said container holder support means in said path;

container holder means mounted on said container holder support means for movement therewith and having recesses therein for receiving containers from said peripheral portion of said bottom and holding said containers in a lying position;

discharge openings in said container holder means for allowing containers to pass therethrough;

container support shelf means extending below said container holder means for supporting containers in a lying position in said recesses during movement of said container holder means;

a discharge section in said support shelf means for discontinuing support of containers at a predetermined location so that containers in said container holder means pass through said discharge openings at said discharge section;

tilting means on said container holder means engaging a part of each container for tilting each container into a predetermined position as each container passes through a respective discharge opening at said discharge section;

chute means mounted below and movable with said container holder means for receiving, orientating and guiding containers passing through said discharge openings into a predetermined position, each chute means having a lower exit portion;

said container holder means comprising a plurality of exchangeable hollow frame-shaped container holders each having inner dimensions forming one of said recesses so that each recess contains most of a container body therein;

a charging opening in each container holder for passage of a container therethrough into said recess;

inclined plane means directed towards said central part of said main hopper and disposed between said bottom of said main hopper and said charging openings of said container holders;

an upwardly extending central axis for said main hopper and container holder support means;

a central bushing rotatably mounted on said main hopper coaxially with said central axis;

a plurality of radial arms integral with said central bushing and positioned in said main hopper;

radially outer ends on said arms each comprising an elastic portion backwardly curved with respect to the rotating direction of said arms for engaging and removing containers wrongly positioned relative to said container holders towards a charging area for said main hopper; and means for driving said central bushing in a direction of rotation opposite to the direction of movement of said container holder means.

* * * * *

UNITED STATES PATENT AND TRADEMARK OFFICE
CERTIFICATE OF CORRECTION

PATENT NO. : 5,415,322
DATED : May 16, 1995
INVENTOR(S) : Jaime Marti Sala

It is certified that error appears in the above-indentified patent and that said Letters Patent is hereby corrected as shown below:

On the title page, item [76] should read —Jaime Marti Sala—.
item [19] should read —Marti Sala—.

Signed and Sealed this

Twenty-fifth Day of July, 1995

Attest:

BRUCE LEHMAN

*Attesting Officer*      *Commissioner of Patents and Trademarks*